United States Patent
Kuo et al.

(10) Patent No.: US 8,552,578 B2
(45) Date of Patent: Oct. 8, 2013

(54) VEHICLE MIRROR ASSEMBLY FOR GENERATING ELECTRICAL ENERGY

(75) Inventors: Yuan-Lung Kuo, Taipei Hsien (TW); Yu-An Lin, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 594 days.

(21) Appl. No.: 12/792,923

(22) Filed: Jun. 3, 2010

(65) Prior Publication Data

US 2011/0156401 A1 Jun. 30, 2011

(30) Foreign Application Priority Data

Dec. 25, 2009 (TW) .............................. 98144912 A

(51) Int. Cl.
*F03D 9/00* (2006.01)

(52) U.S. Cl.
USPC ............................................ 290/55; 180/165

(58) Field of Classification Search
USPC .......... 290/44, 55; 180/54.1, 65.1, 65.2, 65.4, 180/165
See application file for complete search history.

(56) References Cited

U.S. PATENT DOCUMENTS

| | | | | |
|---|---|---|---|---|
| 3,513,326 A * | 5/1970 | Potts | ................ | 290/55 |
| 3,712,703 A * | 1/1973 | Newdigate | ................ | 359/508 |
| 3,878,913 A * | 4/1975 | Lionts et al. | ................ | 180/2.2 |
| 4,320,937 A * | 3/1982 | Schuwerk | ................ | 359/508 |
| 5,280,827 A * | 1/1994 | Taylor et al. | ................ | 180/165 |
| 6,386,712 B1 * | 5/2002 | Warner | ................ | 359/507 |
| 7,237,917 B2 * | 7/2007 | Yamada et al. | ................ | 359/873 |
| 7,679,210 B2 * | 3/2010 | Zhu | ................ | 290/55 |
| 2004/0170025 A1 * | 9/2004 | Pastrick et al. | ................ | 362/494 |
| 2008/0084071 A1 * | 4/2008 | Zhu | ................ | 290/55 |
| 2011/0162924 A1 * | 7/2011 | Laxhuber | ................ | 188/2 R |
| 2011/0241349 A1 * | 10/2011 | Sankar | ................ | 290/55 |

FOREIGN PATENT DOCUMENTS

JP 2001105978 A * 4/2001

* cited by examiner

*Primary Examiner* — Tulsidas C Patel
*Assistant Examiner* — Viet Nguyen
(74) *Attorney, Agent, or Firm* — Altis & Wispro Law Group, Inc.

(57) ABSTRACT

A vehicle mirror includes a main body, a mirror fixed on the main body, and a generator. The generator includes a generating assembly received in the main body. The generating assembly includes a fan, a stator, and a rotor. The rotor is connected to the fan and is capable of rotating relative to the stator when the fan is rotated by wind, such that the generator generates electrical energy.

3 Claims, 3 Drawing Sheets

VEHICLE MIRROR ASSEMBLY FOR GENERATING ELECTRICAL ENERGY

BACKGROUND

1. Technical Field

The present disclosure generally relates to vehicle accessories, and particularly to a vehicle mirror.

2. Description of Related Art

Currently, development of technologies minimizing reliance on non-renewable energy is a priority.

Vehicles generally include electrical storage devices to provide energy for accessories such as taillights, headlights, radios, and others. The storage devices must be charged to provide sufficient operating energy. However, if accessories remain on after use, the storage devices may be exhausted. In addition, the storage devices consume a full draw load during charging, irrespective of the actual amount required.

Therefore, there is room for improvement within the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout several views, and all the views are schematic.

DETAILED DESCRIPTION

Figure 1:
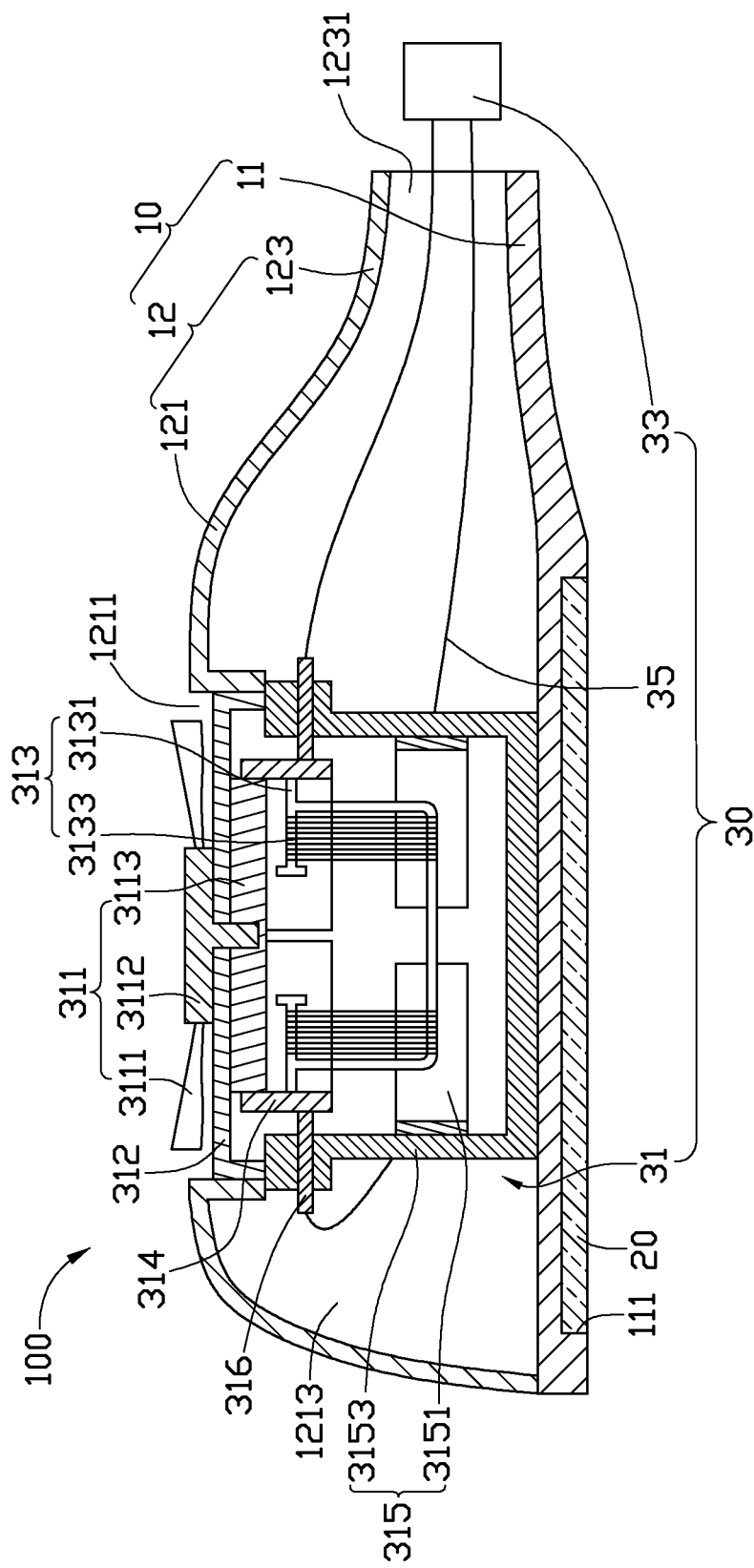
FIG. 1 is a cross-section of an embodiment of a vehicle mirror including a fan, a support member, a rotor, and a rectifier.

Referring to FIG. 1, an embodiment of a vehicle mirror 100 includes a main body 10, a mirror 20 and a generator 30. The mirror 20 and the generator 30 are fixed on the main body 10.

The main body 10 is hollow and includes a first cover 11 and a second cover 12 attached together thereto.

The first cover 11 defines a bay 111 in which the mirror 20 is received. The second cover 12 includes a receiving portion 121 and a connecting portion 123 extending from the receiving portion 121. The receiving portion 121 defines an opening 1211 and a first receiving recess 1213 communicating with the opening 1211. The connecting portion 123 defines a second receiving recess 1231 communicating with the first receiving recess 1213 of the receiving portion 121.

The generator 30 includes a generating assembly 31, an energy storage member 33, and a plurality of leads 35 connecting the generating assembly 31 and the energy storage member 33. When a battery (not shown) of the vehicle is exhausted, the energy storage member 33 provides the backup energy.

The generating assembly 31 is an electric generator and includes a fan 311, a support member 312, a rotor 313, a rectifier 314, a stator 315, and at least one pair of brushes 316. The support member 312 is fixed on the stator 315, and the fan 311 is supported by the support member 312 and capable of rotating relative to the support member 312.

The fan 311 includes a plurality of vanes 3111, a central shaft 3112, and a transmission member 3113. The vanes 3111 are connected to a periphery of the central shaft 3112 and extending in a radial direction. The central shaft 3112 is a stepped shaft having a pivoting portion (not labeled) received in the transmission member 3113 such that the central shaft 3112 rotates with the transmission member 3113 synchronously. One section of the central shaft 3112 having a larger shaft diameter is connected to the vanes 3111, meanwhile, another section of the central shaft 3112 of a shorter shaft diameter is received in the transmission member 3113. The transmission member 3113 includes two protrusions 3113a on a periphery thereof. Alternatively, the transmission member 3113 may include one protrusion 3113a or more than two protrusions 3113a.

The support member 312 includes a plate (not labeled) and a resisting portion (not labeled) extending substantially perpendicular from an edge of the plate, thereby forming a lid-shaped object. Alternatively, the support member 312 may include only a plate.

The rotor 313 includes an iron core 3131 and two windings 3133 encircling the iron core 3131. Alternatively, only one winding 3133 may encircle the iron core 3131.

The rectifier 314 includes two semi-cylindrical plates (not labeled) facing each other.

The stator 315 includes two semi-circular arc/segment magnets 3151 and a receiving member 3153. The receiving member 3153 includes a bottom surface (not labeled) and a sidewall (not labeled) extending substantially perpendicular from an edge of the bottom surface. The magnets 3151 are received in the receiving member 3153 and fixed on an inner sidewall of the receiving member 3153 facing each other. It should be noted that the receiving member 3153 may be omitted, and that the magnets 3151 are fixed on an inner sidewall of the receiving portion 121 of the second cover 12 facing each other.

Each brush 316 passes through the receiving member 3153 of the stator 315 with one end resisting the rectifier 314 and the other end extending outside the receiving member 3153.

Figure 2:
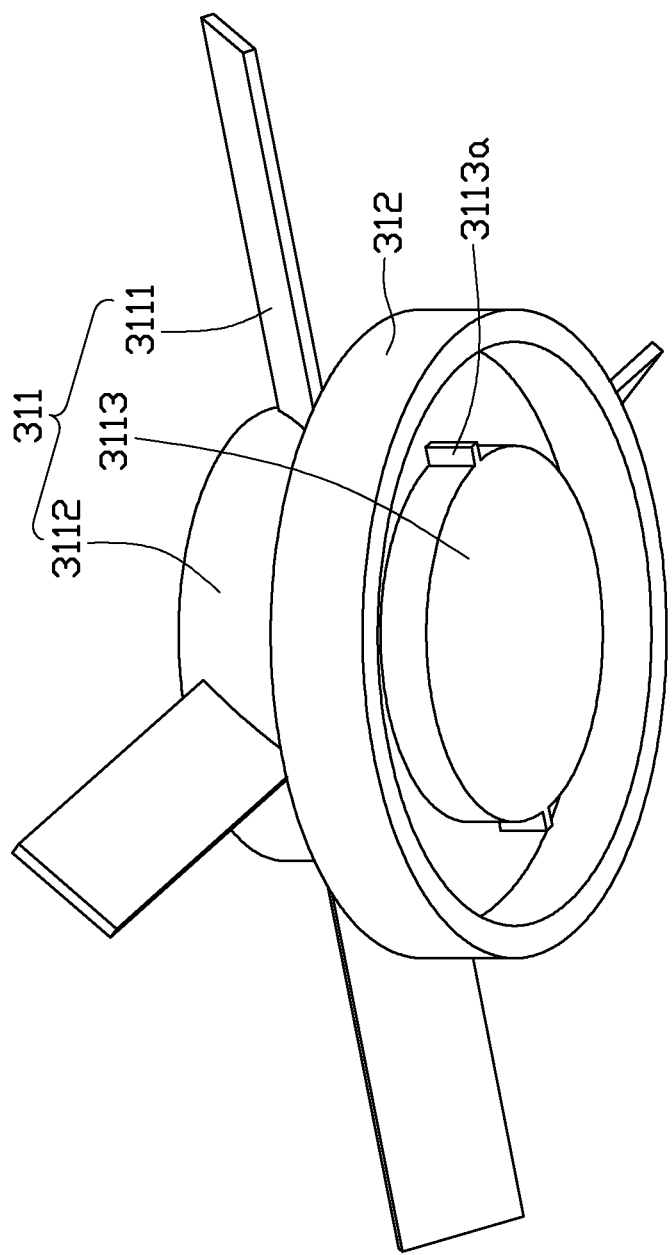
FIG. 2 is an assembled, isometric view of the fan and the support member of FIG. 1.
Figure 3:
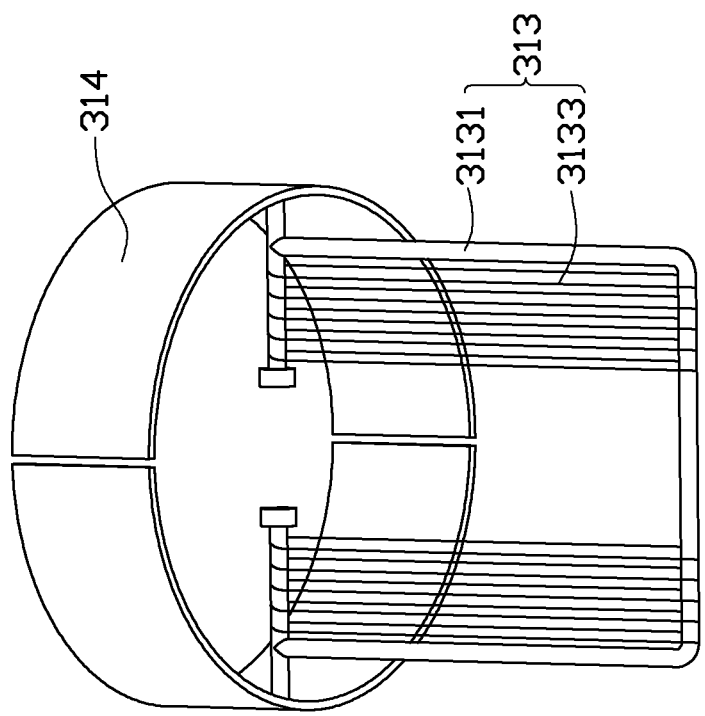
FIG. 3 is an assembled view of the rotor and the rectifier of FIG. 1.

In the generating assembly 31, the central shaft 3112 passes through the support member 312, such that one end of the central shaft 3112 is fixedly received in the transmission member 3113. Two ends of the iron core 3131 of the rotor 313 are fixed on the rectifier 314. By having an end face of the support member 312 facing an end face of receiving member 3153 of the stator 315, the rotor 313 is received in the receiving member 3153 of the stator 315 and partially positioned between the magnets 3151. The rectifier 314 is latched by the protrusions 3113a (see FIG. 2) of the transmission member 3113, and the rectifier 314 is partially received in the receiving member 3153 of the stator 315. The brushes 316 resist the rectifier 314.

In the illustrated embodiment, the energy storage member 33 is an accumulator or a battery. It should be pointed out that the energy storage member 33 may be any other element capable of converting electrical energy to chemical energy for storage.

The leads 35 connect the brushes 316 of the generating assembly 31 and the energy storage member 33, such that an induced current generated by the generating assembly 31 is transferred to the energy storage member 33.

During assembly of the vehicle mirror 100, the first cover 11 is attached to the second cover 12 by adhesive, welding, interlocking, or other means.

The mirror 20 is received or inlaid in the bay 111 of the first cover 11 and fixed therein by adhesive or other means.

The generating assembly 31 is positioned away from the mirror 20 in the first cover 11, and is received in the receiving portion 121 of the second cover 12. The rotor 313, the stator 315, and the brushes 316 are received in the first receiving recess 1213, and the fan 311, support member 312, and the rectifier 314 are received in the opening 1211 of the second cover 12. The support member 312 resists an inner sidewall of the opening 1211 of the second cover 12, and is thus non-rotatable relative to the second cover 12. The receiving member 3153 of the stator 315 is fixed to the first cover 11 or the support member 312.

The brushes 316 and the energy storage member 33 are connected by the leads 35. The energy storage member 33 can be positioned in the first receiving recess 1213 of the second cover 12 or other portion of the vehicle, such as a position adjacent to the engine, for example. When the energy storage member 33 is not positioned in the second cover 12, the leads 35 partially pass through the second receiving recess 1231 of the connecting portion 123 and connect the energy storage member 33 to the generating assembly 31.

The vehicle mirror 100 is connected to a main body of the vehicle through the connecting portion 123 of the second cover 12.

In use, when the vehicle moves, the fan 311 of the generating assembly 31 is rotated by wind, and the rectifier 314 latched by the transmission member 3113 rotates with the fan 311, rotating the rotor 313. The induced current is generated thereby by the rotation of the rotor 313 with respect or relative to the stator 315, and the rectifier 314 converts the induced current into direct current, which is transferred to the energy storage member 33 by the brushes 316 and the leads 35. The energy storage member 33 converts the electrical energy to chemical energy for storage therein.

In addition to utilizing wind energy to generate electrical energy during which the vehicle is being driven, when the fan 311 of the generating assembly 31 is rotated by the wind even when the vehicle is stationary, electrical energy is generated continuously, such that sufficient electrical energy is stored in the energy storage member 33.

Alternatively, the generating assembly 31 may be an alternator. The energy storage member 33 may be omitted, whereby the leads connect the electronic devices in the vehicle to the generating assembly 31 directly.

Finally, while various embodiments have been described and illustrated, the disclosure is not to be construed as limited thereto. Various modifications can be made to the embodiments by those skilled in the art without departing from the true spirit and scope of the disclosure as defined by the appended claims.

What is claimed is:

1. A vehicle mirror assembly comprising:
   a main body comprising a first cover and a second cover attached together, the first cover and the second cover cooperatively defining a receiving space, the first cover comprising a first surface and a second surface opposite to the first surface, the first surface defining a bay, the second cover defining an opening, and the opening communicating with the receiving space and facing the second surface;
   a mirror received in the bay of the first cover; and
   a generator comprising:
      an energy storage member; and
      a generating assembly received in the receiving space and partly exposed via the opening, the generating assembly comprising a fan, a stator, a rotor, two brushes, and a rectifier;
   wherein the rotor is capable of rotating relative to the stator when the fan is rotated by wind, such that the generator generates electrical energy; and
   the rectifier is latched to the fan and the ends of the rotor are fixed on the rectifier, one end of each brush resists the rectifier, and the other end of each brush is connected to the energy storage member, such that the brushes transfer current generated by the generating assembly to the energy storage member;
   wherein the stator comprises two semi-circular arc magnets and a receiving member, the receiving member comprises a bottom plate and a sidewall extending substantially perpendicularly from an edge of the bottom plate, the bottom plate contacts the second surface of the first cover, and the magnets are received in the receiving member and fixed on an inner side of the sidewall of the receiving member facing each other.

2. The vehicle mirror assembly of claim 1, wherein each brush passes through the receiving member with one end resisting the rectifier and the other end extending outside the receiving member.

3. A vehicle mirror assembly comprising:
   a main body comprising a first cover and a second cover attached together, the first cover and the second cover cooperatively defining a receiving space, the first cover comprising a first surface and a second surface opposite to the first surface, the first surface defining a bay, the second cover comprising a receiving portion defining an opening, the opening communicating with the receiving space and facing the second surface, the receiving space comprising a first receiving recess defined by the receiving portion and the first cover;
   a mirror received in the bay of the first cover; and
   a generator received in the receiving space and away from the mirror, the generator comprising:
      a fan exposed by the second cover via the opening, and being capable of generating electrical energy when the fan is rotated by wind;
      a stator, a rotor, and a rectifier, wherein the stator and the rotor are received in the first receiving recess, the rotor rotates with the fan relative to the stator and generates an induced current, and the rectifier converts the induced current to a direct current; and
      an energy storage member and two brushes, each brush positioned with one end resisting the rectifier and the other end connecting to the energy storage member;
   wherein the stator comprises two semi-circular arc magnets and a receiving member, the receiving member comprises a bottom plate and a sidewall extending substantially perpendicularly from an edge of the bottom plate, and the magnets are received in the receiving member and fixed on an inner side of the sidewall of the receiving member facing each other.

* * * * *